(12) United States Patent
Nishimura et al.

(10) Patent No.: US 9,967,109 B2
(45) Date of Patent: May 8, 2018

(54) INFORMATION PRESENTING METHOD, SERVER, AND INFORMATION PRESENTING SYSTEM

(71) Applicant: Panasonic Intellectual Property Corporation of America, Torrance, CA (US)

(72) Inventors: Kozo Nishimura, Osaka (JP); Tomohiko Kitamura, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 222 days.

(21) Appl. No.: 15/000,957

(22) Filed: Jan. 19, 2016

(65) Prior Publication Data

US 2016/0223249 A1    Aug. 4, 2016

(30) Foreign Application Priority Data

Feb. 4, 2015  (JP) .................................. 2015-020734
Nov. 6, 2015  (JP) .................................. 2015-218969

(51) Int. Cl.
  *F25D 29/00*  (2006.01)
  *H04L 12/28*  (2006.01)
  *H04L 12/64*  (2006.01)

(52) U.S. Cl.
  CPC .......... *H04L 12/2827* (2013.01); *F25D 29/00* (2013.01); *H04L 12/6418* (2013.01);
  (Continued)

(58) Field of Classification Search
  CPC ...... F25D 29/00; F25D 29/005; F25D 29/006; F25D 29/008; F25D 2400/36;
  (Continued)

(56) References Cited

U.S. PATENT DOCUMENTS 6,975,910 B1* 12/2005 Brown ................ G06F 19/3475
                                                                 700/90
7,017,359 B2*  3/2006 Kim ........................ F25D 29/00
                                                                   62/127

(Continued)

FOREIGN PATENT DOCUMENTS

JP   11-030472   2/1999
JP   2004-085173 3/2004
JP   3106792 U   1/2005

*Primary Examiner* — Jonathan Bradford
(74) *Attorney, Agent, or Firm* — Greenblum & Bernstein, P.L.C.

(57) ABSTRACT

An information presenting method includes: receiving, from a refrigerator, a signal including an identification result of an identified user; extracting a scheduled future event by referring to schedule information corresponding to the user, based on the identification result of the user, the schedule information being included in a plurality of pieces of schedule information of users; determining an item associated with the extracted scheduled future event; generating information including information that is to be presented to the user, based on the determined item, the information that is to be presented to the user being included in stock information that relates to one or more items stored in the refrigerator; and transmitting, to an apparatus through the network, a signal for causing the apparatus to output the generated information.

15 Claims, 14 Drawing Sheets

(52) U.S. Cl.
CPC ...... *F25D 29/008* (2013.01); *F25D 2400/361* (2013.01); *F25D 2500/06* (2013.01); *F25D 2700/04* (2013.01)

(58) Field of Classification Search
CPC ........... F25D 2400/361; F25D 2500/06; F25D 2600/02; F25D 2600/006; F25D 2700/04; H04L 12/2823; H04L 12/2825; H04L 12/2827; H04L 12/2829
See application file for complete search history.

(56) References Cited

U.S. PATENT DOCUMENTS

| | | | |
|---|---|---|---|
| 7,907,054 B1 * | 3/2011 | Nguyen | ................. F25D 29/00 340/3.1 |
| 2001/0010516 A1 | 8/2001 | Roh et al. | |
| 2004/0035123 A1 | 2/2004 | Kim et al. | |

* cited by examiner

FIG. 3

| ITEM | QUANTITY |
|---|---|
| MILK | 1 |
| EGG | 8 |
| BUTTER | 1 |
| BEER | 5 |
| KIMCHI | 1 |
| PORK | 1 |
| CHICKEN MEAT | 2 |
| CARROT | 3 |
| CABBAGE | 1/2 |
| BELL PEPPER | 2 |
| GYOZA | 1 |
| : | : |

| USER | COOK |
|---|---|
| A | NO |
| B | YES |
| C | NO |
| D | YES |

| ITEM | DURATION 213 |
|---|---|
| KIMCHI | 6 HOURS |
| KUSAYA | 3 HOURS |
| GYOZA | 3 HOURS |
| : | : |

FIG. 6

| START DATE AND TIME | END DATE AND TIME | EVENT 300 |
|---|---|---|
| 01/25/2015 11:00 | 01/25/2015 17:00 | DATE WITH X |
| 01/26/2015 9:00 | 01/26/2015 10:00 | MEETING WITH Y AND Z |
| 01/31/2015 10:00 | 01/31/2015 18:00 | ORAL TEST |
| : | : | : |

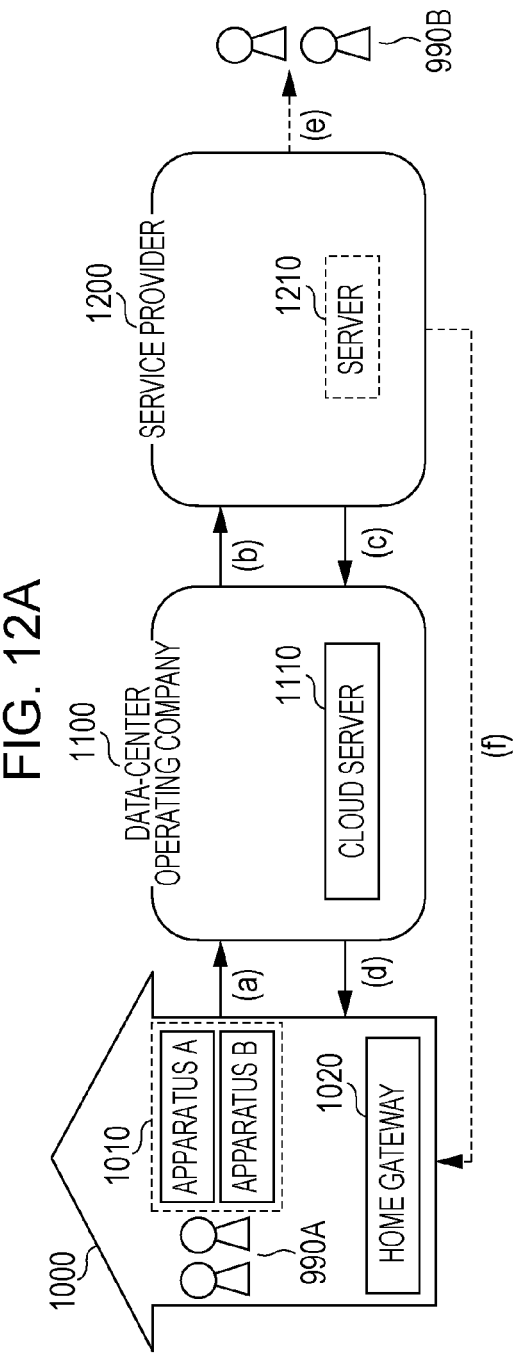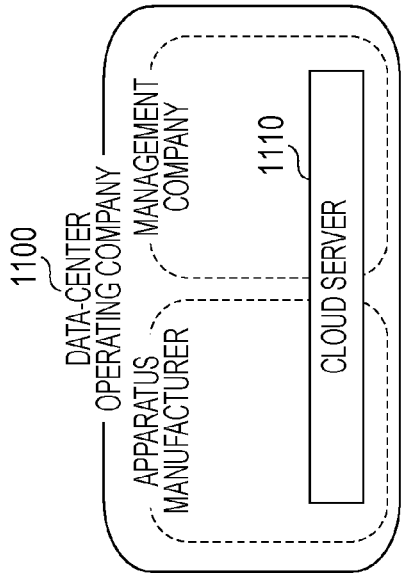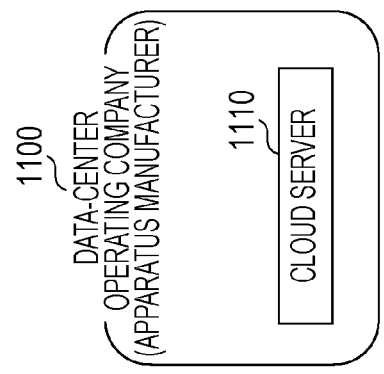

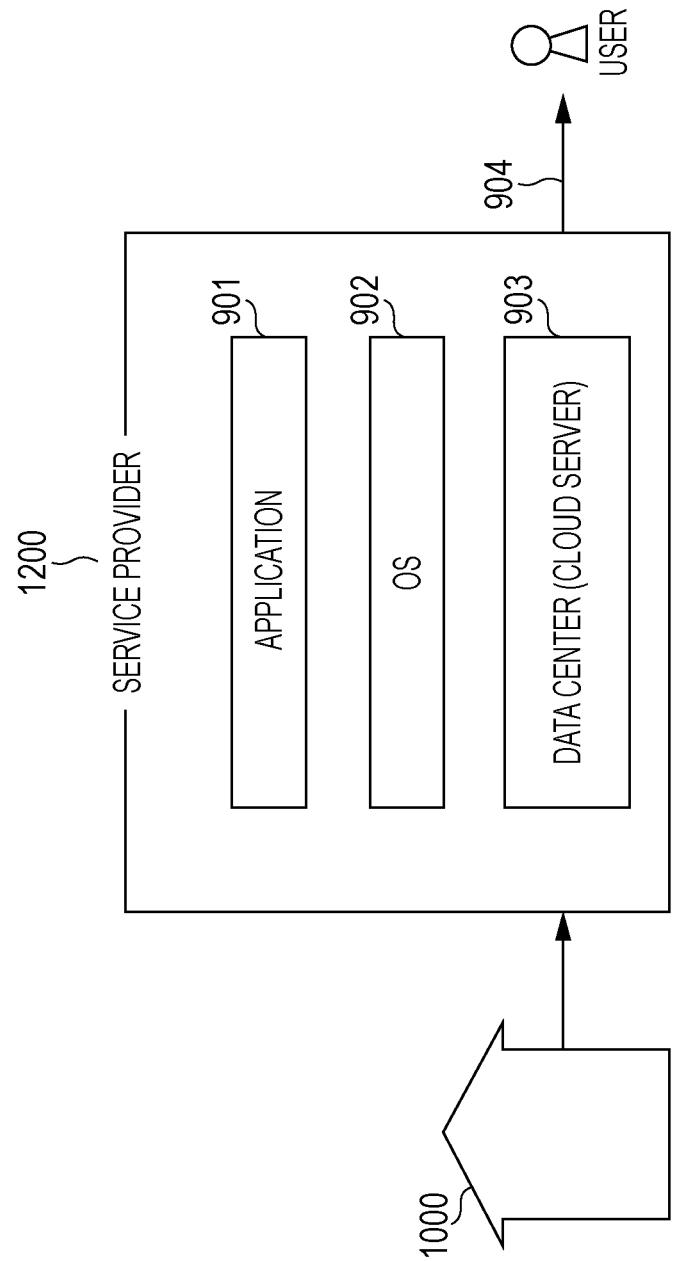

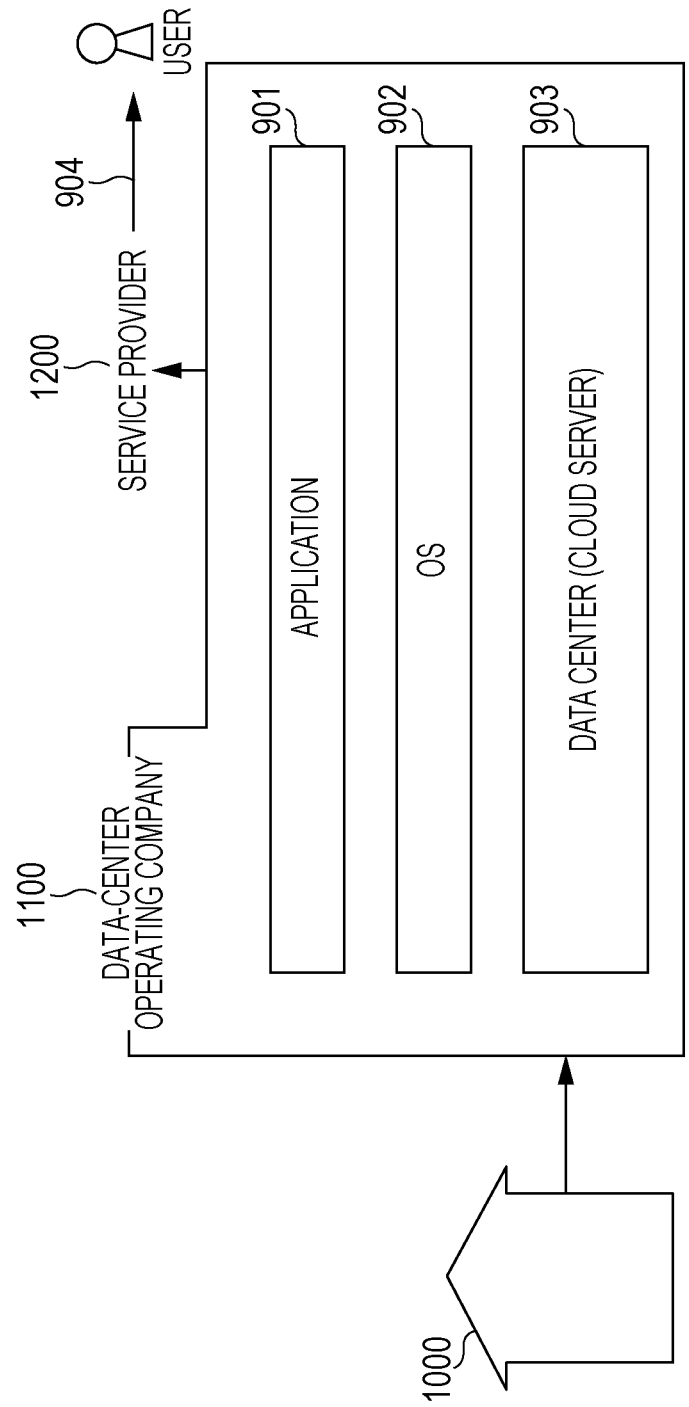

INFORMATION PRESENTING METHOD, SERVER, AND INFORMATION PRESENTING SYSTEM

BACKGROUND

1. Technical Field

The present disclosure relates to presenting a user with information relating to one or more items stored in a refrigerator.

2. Description of the Related Art

There are refrigerators having displays on the front surfaces thereof. For example, stock information of foodstuffs stored in the refrigerators and so on are displayed on the displays.

For such refrigerators, there has been proposed a technology in which display of stock information is changed according to a user's preference, physical constitution, and health condition to present appropriate information to the user (see, for example, Japanese Unexamined Patent Application Publication No. 2004-85173).

SUMMARY

In one general aspect, the techniques disclosed here feature an information presenting method for presenting a user with information that relates to one or more items stored in a refrigerator having a sensor for identifying the user. The method includes: receiving, from a refrigerator through a network, a signal including an identification result of a user identified by a sensor included in the refrigerator; extracting a scheduled future event by referring to schedule information corresponding to the user, based on the identification result of the user, the schedule information being included in a plurality of pieces of schedule information of users stored in a memory; determining an item associated with the extracted scheduled future event; generating information including information that is to be presented to the user, based on the determined item, the information that is to be presented to the user being included in stock information that is stored in the memory and that relates to one or more items stored in the refrigerator; and transmitting, to an apparatus used by the user through the network, a signal for causing the apparatus to output the generated information.

In the information presenting method and so on according to one aspect of the present disclosure, when information relating to one or more foodstuffs stored in a refrigerator is presented to a user, information that is more suitable for the user can be presented.

It should be noted that general or specific embodiments may be implemented as a system, an apparatus, a device, an integrated circuit, a computer program, a computer-readable recording medium such as a compact disc read-only memory (CD-ROM), or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 3 is a table illustrating one example of stock information in the first embodiment;

FIG. 4 is a table illustrating one example of user information in the first embodiment;

FIG. 5 is a table illustrating one example of item information in the first embodiment;

FIG. 6 is a table illustrating one example of schedule information in the first embodiment;

FIG. 12A is a diagram illustrating an overview of a service presenting system in a second embodiment;

FIG. 12B is a diagram illustrating another example of a data-center operating company in the second embodiment;

FIG. 12C is a diagram illustrating another example of the data-center operating company in the second embodiment;

FIG. 13 is a diagram illustrating service type 1 (an inhouse data center type) the second embodiment;

FIG. 16 is a diagram illustrating service type 4 (a SaaS usage type) in the second embodiment.

DETAILED DESCRIPTION

Findings Underlying Present Disclosure

Figure 1:
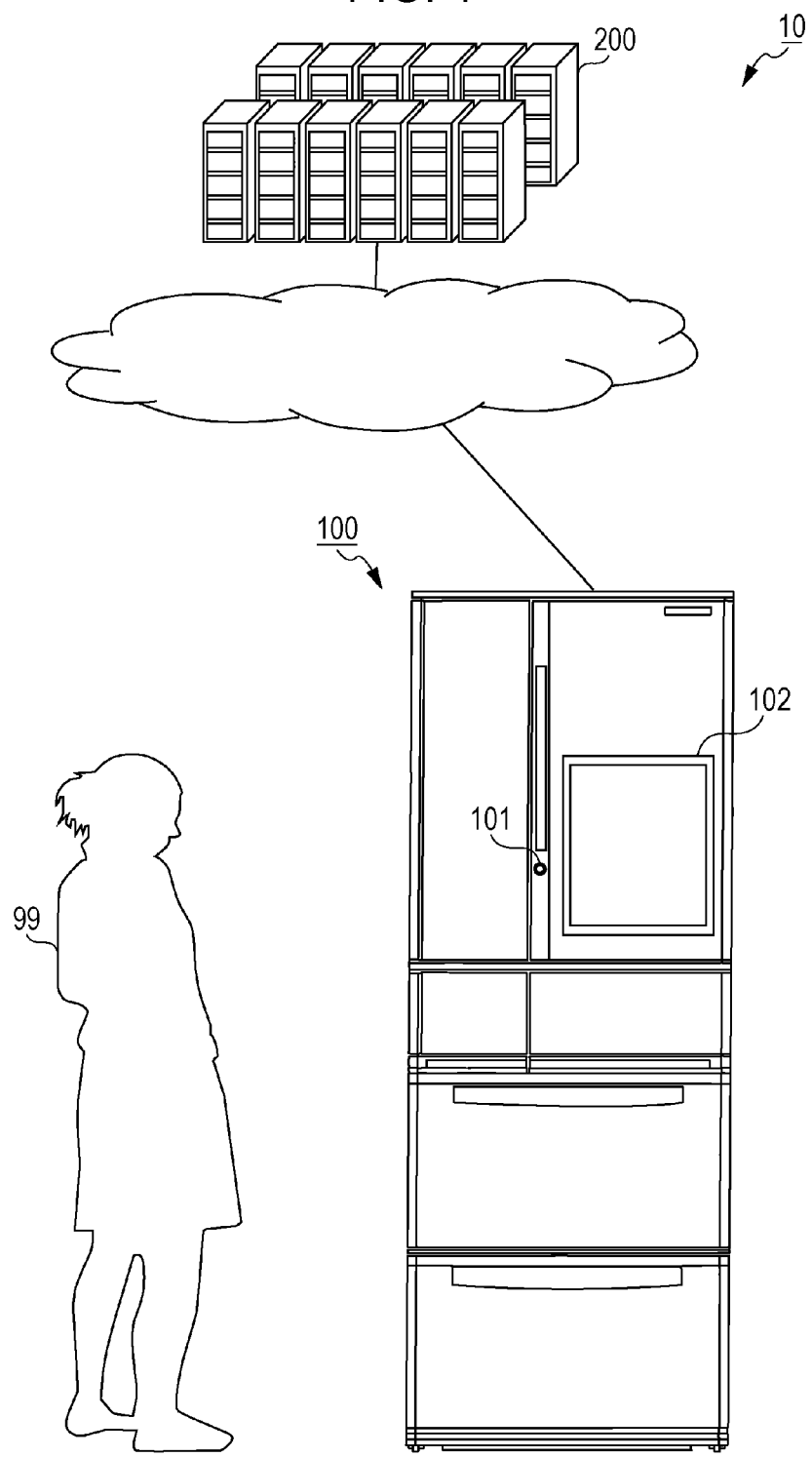
FIG. 1 is a diagram illustrating a use case of an information presenting system according to a first embodiment.

There are demands for further improvement in the above-noted related technology. In the related technology, display of the stock information is changed according to a user's preference, physical constitution, and health condition. However, even when the user's preference, physical constitution, and health condition does change, there are cases in which information suitable for him or her changes depending on his or her activity schedule.

The present disclosure provides an information presenting method that allows information that is more suitable for a user to be presented when information relating to one or more foodstuffs stored in a refrigerator is presented to the user.

An information presenting method according to one aspect of the present disclosure is directed to an information presenting method. The method includes: receiving, from a refrigerator through a network, a signal including an identification result of a user identified by a sensor included in the refrigerator; extracting a scheduled future event by referring to schedule information corresponding to the user, based on the identification result of the user, the schedule information being included in a plurality of pieces of schedule information of users stored in a memory; determining an item associated with the extracted event; generating information including information that is to be presented to the user, based on the determined item, the information that is to be presented to the user being included in stock information that is stored in the memory and that relates to one or more items stored in the refrigerator; and transmitting, to an apparatus used by the user through the network, a signal for causing the apparatus to output the generated information.

According to this method, on the basis of an item associated with a scheduled future event extracted by referring to the schedule information corresponding to a user, information relating to one or more items stored in a refrigerator can presented to the user through outputting from an apparatus used by the user. Thus, it is possible to present the user with information relating to an item that is suitable for his or her activity schedule.

For example, in the determining of the item, an item pre-defined as an item that adversely affects the scheduled future event may be determined as an item associated with the scheduled future event.

According to this method, information relating to one or more items stored in a refrigerator can be presented to a user, based on an item that adversely affects an scheduled future event. Thus, it is possible to prevent or reduce the user taking out the item that adversely affects the scheduled future event from the refrigerator.

For example, the scheduled future event may be an event for the user to meet a person, and the item that adversely affects the scheduled future event is an item whose smell remains after eating the item.

According to this method, when an event for a user to meet a person is scheduled, it is possible to determine an item whose smell remains after eating. Thus, information can be presented to the user, based on the item whose smell remains after eating. As a result, it is possible to prevent or reduce the user ingesting an item whose smell remains after eating, before an event for the user to meet a person is started.

For example, the information presenting method may calculating a difference time between a current date and time and a start date and time of the scheduled future event, and in the determining of the item, an item having a duration that is pre-defined as a period of time for which smell remains after eating the item and that is larger than the difference time may be determined as an item associated with the scheduled future event.

According to this method, it is possible to determine an item associated with a scheduled future event, considering the duration for which the smell remains after eating and the difference time between the current date and time and the start date and time of the scheduled future event. Accordingly, it is possible to determine an item whose smell remains until the start date and time of the scheduled future event as an item associated with the scheduled future event, and it is also possible not to determine an item whose smell disappears before the start date and time of the scheduled future event as an item associated with scheduled future the event. As a result, it is possible to appropriately determine an item that adversely affects the scheduled future event.

For example, in the generating of the information, of the stock information that is stored in the memory and that relates to the one or more items stored in the refrigerator, the information relating to an item different from the determined item may be generated as the information that relates to the one or more items and that is to be presented to the user.

According to this method, it is possible to present a user with information relating to an item that is different from the item that adversely affects a scheduled future event. Thus, when a user takes out an item from the refrigerator on the basis of the presented information, it is possible to prevent or reduce taking out an item that adversely affects the scheduled future event.

For example, in the generating of the information, of the stock information that is stored in the memory and that relates to the one or more items stored in the refrigerator, the information relating to the same item as the determined item may be generated as the information that relates to the one or more items and that is to be presented to the user.

According to this method, it is possible to present the user with information relating to an item that is the same as the item that adversely affects the scheduled future event. Thus, the user can recognize the item that adversely affects the scheduled future event. Thus, when a user takes out an item from the refrigerator on the basis of the presented information, it is possible to prevent or reduce taking out an item that adversely affects the scheduled future event.

For example, the information presenting method may further include determining whether or not the user is a person who prepares a meal for another person, based on the identification result of the user; and in the extracting of the scheduled future event, when it is determined that the user is a person who prepares a meal for another person, the scheduled future event may be extracted by referring to the schedule information corresponding to the user and schedule information corresponding to the other person.

According to this method, when the user is a person who prepares a meal for other person, it is possible to extract a scheduled future event by referring to the schedule information of the other person in addition to the schedule information of the user. Accordingly, it is possible to prevent or reduce the user preparing a meal including an item that adversely affects a scheduled future event for the other person.

For example, in the extracting of the scheduled future event, an event scheduled within a pre-defined period from a current date and time may be extracted as the scheduled future event.

According to this method, it is possible to extract an event scheduled within a pre-defined period from the current date and time. Accordingly, it is possible to extract an event on which intake of an item has a large influence, and it is possible to more appropriately present the user with information relating to an item suitable for the activity schedule of the user.

For example, the apparatus used by the user may be the refrigerator; and in the transmitting of the signal, a signal for causing a display included in the refrigerator to display the generated information may be transmitted to the refrigerator through the network.

According to this method, on the basis of an item associated with an event extracted by referring to the schedule information corresponding to a user, information relating to one or more items stored in a refrigerator can presented to the user through display on a display included in the refrigerator. Thus, it is possible to present the user with information relating to an item that is suitable for his or her activity schedule.

For example, the apparatus used by the user may be the refrigerator; and in the transmitting of the signal, a signal for causing an audio output unit included in the refrigerator to output the generated information may be transmitted to the refrigerator through the network.

According to this method, on the basis of an item associated with an event extracted by referring to the schedule information corresponding to a user, information relating to one or more items stored in a refrigerator can presented to the user through outputting from an audio output unit included in the refrigerator. Thus, it is possible to present the user with information relating to an item that is suitable for his or her activity schedule.

For example, the apparatus used by the user may be a portable terminal; and in the transmitting of the signal, a signal for causing a display included in the portable terminal to display the generated information may be transmitted to the portable terminal through the network.

According to this method, on the basis of an item associated with an event extracted by referring to the schedule information corresponding to a user, information relating to one or more items stored in a refrigerator can presented to the user through display on a display included in a portable terminal. Thus, it is possible to present the user with information relating to an item that is suitable for his or her activity schedule.

For example, the apparatus used by the user may be a portable terminal, in the transmitting of the signal, a signal for causing an audio output unit included in the portable terminal to output the generated information may be transmitted to the portable terminal through the network.

According to this method, on the basis of an item associated with an event extracted by referring to the schedule information corresponding to a user, information relating to one or more items stored in a refrigerator can presented to the user through outputting from an audio output unit included in a portable terminal. Thus, it is possible to present the user with information relating to an item that is suitable for his or her activity schedule.

For example, a processor may perform at least one of the receiving of the signal including the identification result of the user, the extracting of the future event, the determining of the item, the generating of the information relating to the one or more items, and the transmitting of the signal for causing the apparatus used by the user to output the generated information.

A recording medium according to one aspect of the present disclosure is directed to a computer-readable non-transitory recording medium recording a program. The program causes a computer to execute: receiving, from a refrigerator through a network, a signal including an identification result of a user identified by a sensor included in the refrigerator; extracting a scheduled future event by referring to the schedule information corresponding to the user, based on the identification result of the user, the schedule information being included in a plurality of pieces of schedule information of users stored in a memory; determining an item associated with the extracted scheduled future event; generating information including information that is to be presented to the user, based on the determined item, the information that is to be presented to the user being included in stock information that is stored in the memory and that relates to one or more items stored in the refrigerator; and transmitting, to an apparatus used by the user through the network, a signal for causing the apparatus to output the generated information.

According to this recording medium, on the basis of an item associated with a scheduled future event extracted by referring to the schedule information corresponding to a user, information relating to one or more items stored in a refrigerator can presented to the user through outputting from an apparatus used by the user. Thus, it is possible to present the user with information relating to an item that is suitable for his or her activity schedule.

A server according to one aspect of the present disclosure is directed to a server. The server includes: a receiver that receives, from a refrigerator through a network, a signal including an identification result of a user identified by a sensor included in the refrigerator; a memory that stores a plurality of pieces of schedule information of users and the information relating to the one or more items stored in the refrigerator; an event extractor that extracts a scheduled future event by referring to the schedule information corresponding to the user, based on the identification result of the user, the schedule information being included in the plurality of pieces of schedule information of the users stored in the memory; an item determiner that determines an item associated with the scheduled future event; an information generator that generates information including information that is to be presented to the user, based on the determined item, the information that is to be presented to the user being included in stock information that is stored in the memory and that relates to one or more items stored in the refrigerator; and a transmitter that transmits, to an apparatus used by the user through the network, a signal for causing the apparatus to output the generated information.

According to this server, on the basis of an item associated with a scheduled future event extracted by referring to the schedule information corresponding to a user, information relating to one or more items stored in a refrigerator can presented to the user through outputting from an apparatus used by the user. Thus, it is possible to present the user with information relating to an item that is suitable for his or her activity schedule.

For example, at least one of the receiver, the event extractor, the item determiner, the information generator, and the transmitter may include a processor.

An information presenting system according to one aspect of the present disclosure is directed to an information presenting system that includes: a refrigerator; and a server that is connected to the refrigerator through a network. The refrigerator includes a sensor that identifies a user; and a transmitter that transmits, to the server through the network, a signal including an identification result of the user identified by the sensor. The server includes a receiver that receives, from the refrigerator through the network, a signal including the identification result of the user identified by the sensor; a memory that stores a plurality of pieces of schedule information of users and stock information relating to one or more items stored in the refrigerator; an event extractor that extracts a scheduled future event by referring to the schedule information corresponding to the user, based on the identification result of the user, the schedule information being included in the plurality of pieces of schedule information of the users stored in the memory; an item determiner that determines an item associated with the extracted scheduled future event: an information generator that generates information including information that is to be presented to the user, based on the determined item, the information that is to be presented to the user being included in stock information that is stored in the memory and that relates to the one or more items stored in the refrigerator; and a transmitter that transmits, to an apparatus used by the user through the network, a signal for causing the apparatus to output the generated information.

According to this information presenting system, on the basis of an item associated with a scheduled future event extracted by referring to the schedule information corresponding to a user, information relating to one or more items stored in a refrigerator can presented to the user through outputting from an apparatus used by the user. Thus, it is possible to present the user with information relating to an item that is suitable for his or her activity schedule.

It should be noted that general or specific embodiments may be implemented as a system, an apparatus, a device, an integrated circuit, a computer program, a computer-readable recording medium such as a CD-ROM, or any selective combination thereof.

Embodiments will be described below in detail with reference to the accompanying drawings.

The embodiments described below all represent general or specific examples. Numerical values, shapes, constituent elements, the arrangement positions and connections of the constituent elements, steps, an order of steps, and so on described below in the embodiments are merely examples and are not intended to limit the present disclosure. Of the constituent elements in the embodiments described below, constituent elements not set forth in the independent claims that represent the broadest concept will be described as optional constituent elements.

First Embodiment

[Use Case of Information Presenting System]

FIG. 1 is a diagram illustrating a use case of an information presenting system 10 according to a first embodiment. The information presenting system 10 includes a refrigerator 100 and a server 200. For example, the refrigerator 100 and the server 200 are connected to each other through a network. The network may be a cable network or a wireless network.

The refrigerator 100 stores items to be ingested into the body of a user 99. The term "items" as used herein refers to, for example, foods (including foodstuffs and prepared foods), seasonings, beverages, and medicines.

The refrigerator 100 includes a sensor 101 and a display 102. The sensor 101 is used to identify the user 99. In the present embodiment, the sensor 101 is, for example, a camera that photographs the user 99 who is present near the refrigerator 100. The display 102 is used to present information relating to one or more items stored in the refrigerator 100. In the present embodiment, the display 102 is a touch screen.

The server 200 is, for example, a cloud server. The server 200 receives an identification result of the user 99 from the refrigerator 100. Based on the identification result, the server 200 transmits, to the refrigerator 100, information relating to one or more items stored in the refrigerator 100.

The information relating to one or more items stored in the refrigerator 100 may be, for example, information merely indicating one or more items. For example, when the one or more items are a plurality of items, the information relating to one or more items may be information indicating at least one of the plurality of items. Also, for example, the information relating to one or more items may be information indicating the amount(s) of stock of the one or more items. In addition, for example, the information relating to the one or more items may be information indicating a recipe of a dish using the one or more items.

In the present embodiment, a description will be given of an example of a case in which the information relating to one or more items is information indicating at least one of a plurality of items and the amount of stock of the at least one item. Before opening the door of the refrigerator 100, the user 99 can quickly take out a desired item or items from the refrigerator 100 by checking the information indicating items and the amount of stock displayed on the display 102.

[Functional Configuration of Information Presenting System]

Figure 2:
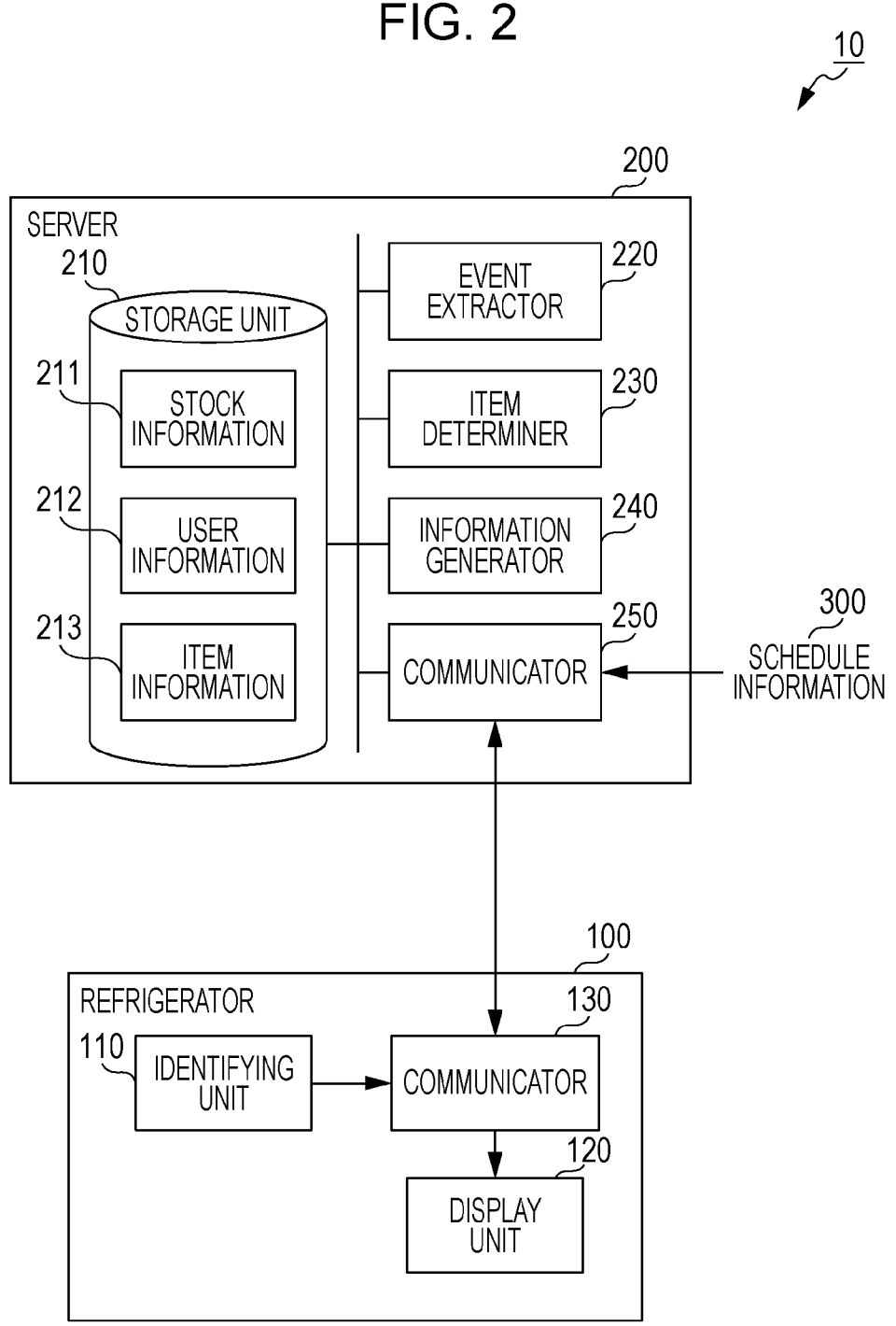
FIG. 2 is a block diagram illustrating a functional configuration of the information presenting system according to the first embodiment.

Next, a functional configuration of the information presenting system 10 will be described with reference to FIG. 2. FIG. 2 is a block diagram illustrating a functional configuration of the information presenting system 10 according to the first embodiment.

[Functional Configuration of Refrigerator]

The refrigerator 100 includes an identifying unit 110, a display unit 120, and a communicator 130.

The identifying unit 110 is implemented by, for example, a sensor 101, a processor, and a memory. The identifying unit 110 identifies a user. Specifically, the identifying unit 110 detects a face area in an image of the user 99 photographed by the sensor 101. The identifying unit 110 then extracts an amount of features from the detected face area. In addition, the identifying unit 110 identifies an identifier of the user 99 by verifying the extracted amount of features against a plurality of amounts of features pre-held in association with the identifiers of a plurality of users.

The display unit 120 is one example of an information presenting unit and is implemented by, for example, the display 102 and a digital signal processor. The display unit 120 displays, on the display 102, display information received from the server 200 to thereby present the user 99 with the information relating to one or more items stored in the refrigerator 100.

The communicator 130 is implemented by, for example, a network adapter. The communicator 130 communicates with the server 200. The communicator 130 includes, for example, a receiver (not illustrated) and a transmitter (not illustrated). More specifically, the transmitter in the communicator 130 transmits signals including the identification result (e.g., the identifier) of the user 99 to the server 200, the identification result being obtained by the identifying unit 110. In addition, the receiver in the communicator 130 receives, from the server 200, signals for causing the display 102 to display the display information.

[Functional Configuration of Server]

The server 200 includes a storage unit 210, an event extractor 220, an item determiner 230, an information generator 240, and a communicator 250.

The storage unit 210 is implemented by, for example, a memory. Examples of the memory include a hard disk and a semiconductor memory. The storage unit 210 stores stock information 211, user information 212, and item information 213 therein.

The stock information 211 is information indicating items stored in the refrigerator 100 and the quantity (i.e., the amount of stock) thereof. One example of the stock information 211 is described later with reference to FIG. 3.

The user information 212 is information relating to a plurality of users associated with the refrigerator 100. In the present embodiment, the user information 212 includes information indicating whether or not each of the users is a person who prepares meals for other people. One example of the user information 212 is described later with reference to FIG. 4.

The item information 213 is information relating to items. In the present embodiment, the item information 213 includes information relating to items whose smells remain after eating. One example of the item information 213 is described later with reference to FIG. 5.

The event extractor 220 is implemented by, for example, a processor and a memory. Based on the identification result of the user 99, the event extractor 220 refers to schedule information 300 for the user 99 to extract scheduled future events. The future events refer to events after the current date and time.

Herein, an event, an appointment, a task, and so on are all referred to as "events", without distinguishing therebetween.

For example, the event extractor 220 extracts events scheduled within a pre-defined period from the current date and time as scheduled future events. The pre-defined period may be determined, for example, empirically or experimentally. The pre-defined period may vary depending on the current time. For example, the pre-defined period may be half a day when the current time is in the morning and may be one day when the current time is in the afternoon.

Details of the events to be extracted are not particularly limiting. For example, the events may be events for the user 99 to meet other people. For example, the events may be tests (e.g., an achievement test and an employment test).

The schedule information 300 indicates the dates and times and the details of scheduled events. For example, the schedule information 300 is calendar data managed by a personal calendar application or the like. The schedule information 300 employs, for example, a file format, such as iCalendar or vCalendar. One example of the schedule information 300 is described later with reference to FIG. 6.

The item determiner 230 is implemented by, for example, a processor and a memory. The item determiner 230 determines items associated with the event extracted by the event extractor 220. More specifically, for example, by referring to the item information 213, the item determiner 230 determines pre-defined items as items that adversely affect the event. The items that adversely affect the event are, for example, items whose smells remain after eating them.

The information generator 240 is implemented by, for example, a processor and a memory. Based on the items determined by the item determiner 230, the information generator 240 generates display information relating to one or more items stored in the refrigerator 100. More specifically, the information generator 240 generates, as the display information, information relating to, for example, an item or items that are included in the one or more items stored in the refrigerator 100 and that are different from the items determined by the item determiner 230. That is, the display information does not include information relating to the items determined by the item determiner 230.

The communicator 250 may be realized by, for example, a network adapter. The communicator 250 communicates with the refrigerator 100. The communicator 250 includes, for example, a receiver (not illustrated) and a transmitter (not illustrated). More specifically, the receiver in the communicator 250 receives signals including an identification result of the user 99 from the refrigerator 100, the identification result being obtained by the identifying unit 110 in the refrigerator 100. In addition, the transmitter in the communicator 250 transmits signals for causing the refrigerator 100 to output the display information generated by the information generator 240.

Additionally, the receiver in the communicator 250 receives the schedule information 300 corresponding to the identification result of the user 99. For example, the communicator 250 receives signals including the schedule information 300 from a web server (not illustrated), which supplies a calendar application, through a network. The schedule information 300 included in the received signals is stored in, for example, the storage unit 210. Alternatively, the communicator 250 may be configured so as to receive, from the web server, signals including a plurality of pieces of schedule information 300 of users who use the refrigerator 100 and to store, in the storage unit 210, the plurality of pieces of the schedule information 300 included in the received signals.

[Specific Example of Various Types of Information]

Now, a specific example of various types of information used in the present embodiment will be described with reference FIGS. 3 to 6.

FIG. 3 is a table illustrating one example of the stock information 211 in the first embodiment. The stock information 211 includes information indicating items stored in the refrigerator 100 and information indicating the amounts of stocks of the items. The stock information 211 illustrated in FIG. 3 shows that, for example, the amount of stock of milk is 1 and the amount of stock of eggs is 8.

FIG. 4 is a table illustrating one example of the user information 212 in the first embodiment. The user information 212 includes information indicating users associated with the refrigerator 100 and information indicating whether or not a user is a person who prepares meals for other people (this person may hereinafter be referred to as a "cook"). The user information 212 in FIG. 4 shows that users A and C are not cooks and users B and D are cooks.

FIG. 5 is a table illustrating one example of the item information 213 in the first embodiment. The item information 213 indicates items that adversely affect events. More specifically, the item information 213 includes information indicating items whose smells remain after eating and information indicating the durations of the smells. The item information 213 in FIG. 5 includes kimchi (a fermented vegetable food with seasonings including garlic), kusaya (fermented, salted, and dried fish), and gyoza (dumplings with fillings, such as pork, cabbage, and garlic) and shows that, for example, the smell of kimchi remains for 6 hours after eating.

FIG. 6 is a table illustrating one example of the schedule information 300 in the first embodiment. The schedule information 300 includes information indicating the start date and time and the end date and time of each event and information indicating details of the event. FIG. 6 shows that, for example, a date with X is scheduled for the period of 11:00 to 17:00 on Jan. 25, 2015.

[Operation of Information Presenting System]

Next, a description will be given of an operation of the information presenting system 10 configured described above.

Figure 7:
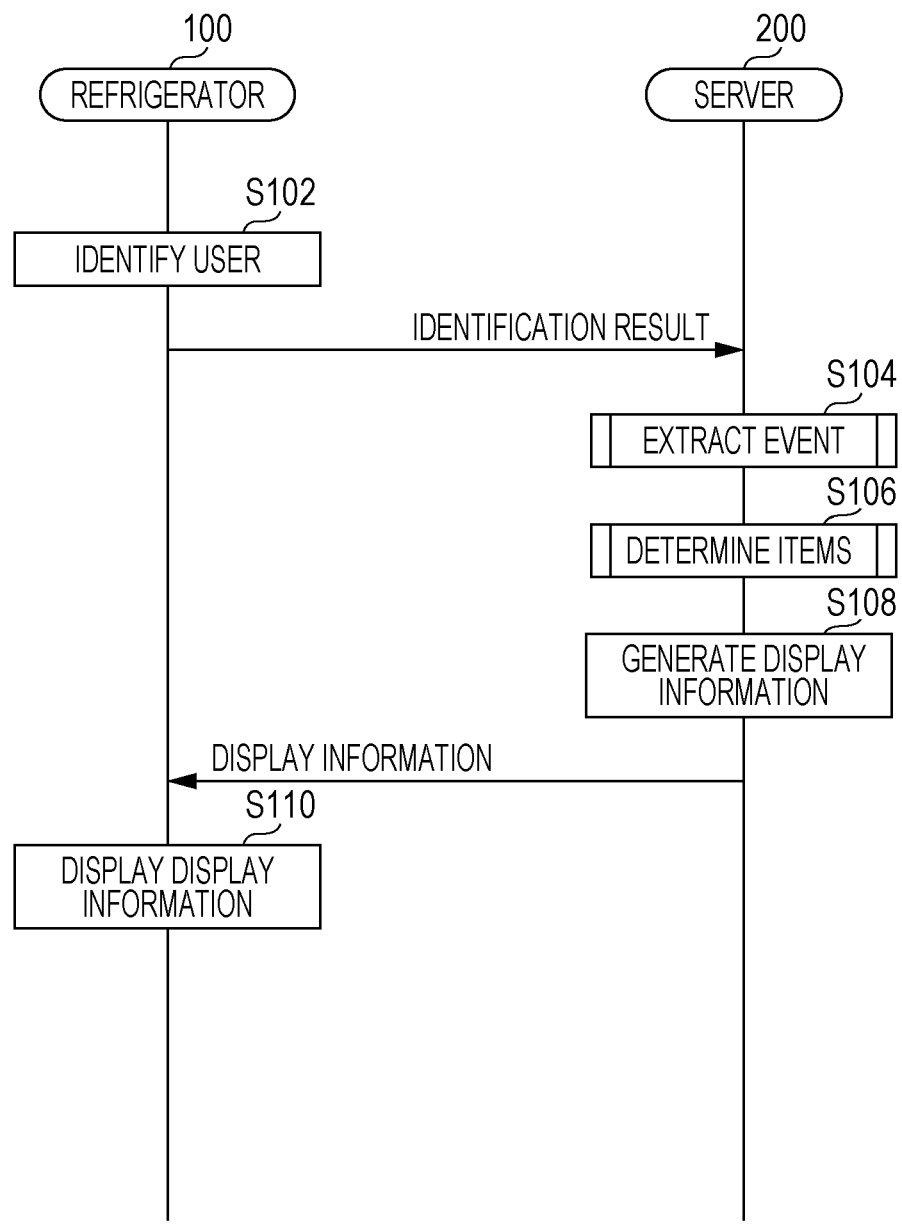
FIG. 7 is a sequence diagram illustrating a flow of information in the information presenting system according to the first embodiment.

First, a flow of information in the information presenting system 10 will be described with reference to FIG. 7. FIG. 7 is a sequence diagram illustrating a flow of information in the information presenting system 10 according to the first embodiment.

The identifying unit 110 in the refrigerator 100 identifies the user 99 (S102). The communicator 130 in the refrigerator 100 transmits signals including an identification result of the user 99 (e.g., an identifier of the user 99), the identification result being obtained by the identifying unit 110, to the server 200 through the network.

The communicator 250 receives the signals including the identification result from the refrigerator 100. Thus, the server 200 obtains the user identification result included in the received signals.

Based on the identification result received from the refrigerator 100, the event extractor 220 in the server 200 extracts a scheduled future event by referring to the schedule information 300 for the user 99, the schedule information 300 being included in a plurality of pieces of schedule information of users stored in the storage unit 210 (S104). Details of this event extraction processing are described later with reference to FIG. 8.

The item determiner 230 in the server 200 determines items that are associated with the extracted event (S106).

Figure 9:
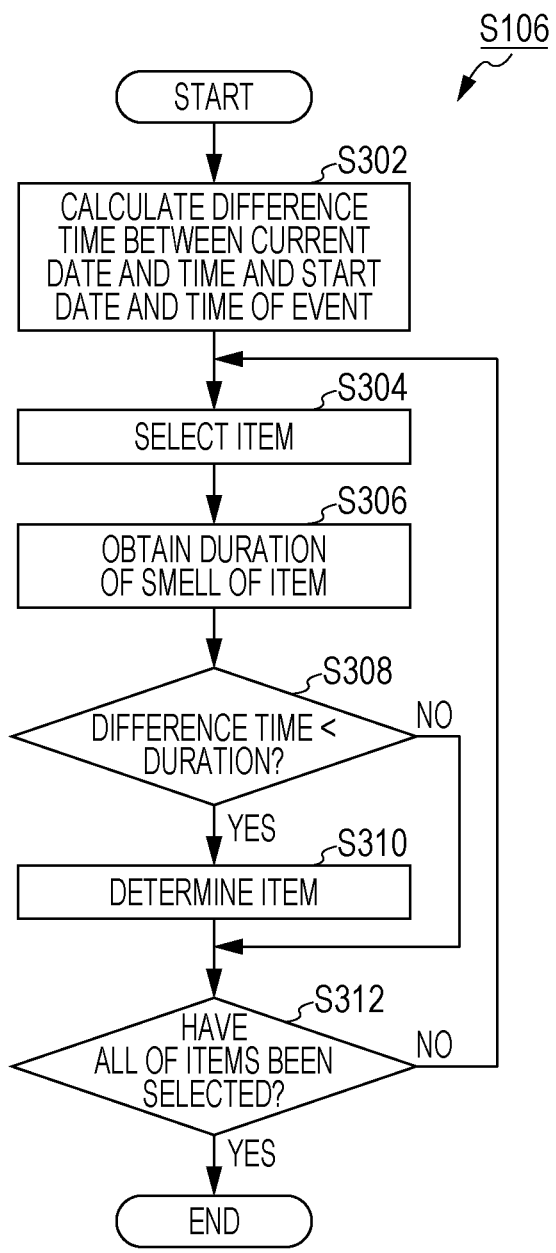
FIG. 9 is a flowchart illustrating details of item determination processing in the first embodiment.

Details of this item determination processing are described later with reference to FIG. 9.

Based on the determined items, the information generator 240 in the server 200 generates display information corresponding to information that relates to one or more items and that is to be presented to the user 99 (S108). The communicator 250 in the server 200 transmits, to the refrigerator 100 through the network, signals for causing the display 102 of the refrigerator 100 to display the generated display information. The signals for causing the display 102 of the refrigerator 100 to display the generated display information include, for example, the generated display information and control information for causing the display 102 to display the display information.

The communicator 130 in the refrigerator 100 receives, from the server 200, the signals for causing the display 102 of the refrigerator 100 to display the display information.

The display unit 120 in the refrigerator 100 displays the display information on the display 102 in accordance with the control information included in the signals received from the server 200 (S110). As a result, the information relating to the one or more items stored in the refrigerator 100 is displayed on the display 102 and is thus presented to the user 99.

Figure 8:
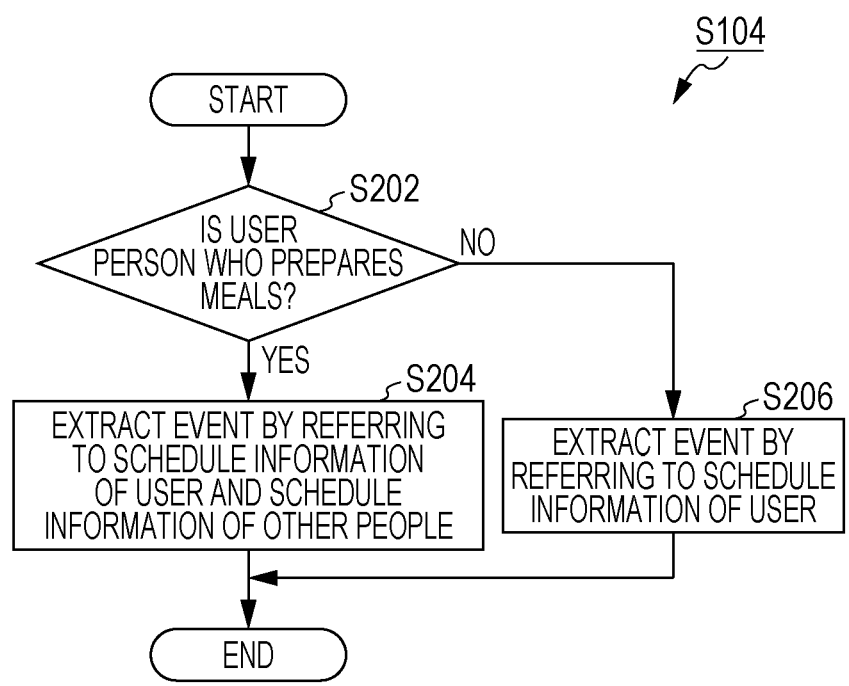
FIG. 8 is a flowchart illustrating details of event extraction processing in the first embodiment.

Next, details of the event extraction processing in step S104 will be described with reference to FIG. 8. FIG. 8 is a flowchart illustrating details of the event extraction processing in the first embodiment.

On the basis of the identification result of the user 99, the event extractor 220 determines whether or not the user 99 is a person who prepares meals for other people (S202). More specifically, by referring to the user information 212 on the basis of the identification result of the user 99, the event extractor 220 determines whether or not the user 99 is a person who prepares meals for other people.

For example, when the identification result of the user 99 indicates "A", the event extractor 220 determines that the user 99 is not a person who prepares meals for other people, by referring to the user information 212 illustrated in FIG. 4. Also, for example, when the identification result of the user 99 indicates "B", the event extractor 220 determines that the user 99 is a person who prepares meals for other people, by referring to the user information 212 illustrated in FIG. 4.

Upon determining that the user 99 is a person who prepares meals for other people (YES in S202), the event extractor 220 extracts a scheduled future event of the user 99 and the other people by referring to the schedule information 300 of the user 99 and the schedule information 300 of the other people (S204). The other people in this case are, for example, people who have the meals prepared by the user 99. For example, when the identification result of the user 99 indicates "B", the other people are the users A, C, and D illustrated in FIG. 4.

For example, when the identification result of the user 99 indicates B, the event extractor 220 obtains the pieces of schedule information 300 of the users A to D, included in the user information 212, via the communicator 250. The event extractor 220 then extracts, from the obtained schedule information 300, an event for the user A, B, C, or D to meet people. More specifically, the event extractor 220 extracts an event for meeting people by searching the schedule information 300, for example, by using a keyword (e.g., date, discussion, meeting, business meeting, or meet-and-greet session) indicating an event for meeting people.

On the other hand, upon determining that the user 99 is not a person who prepares meals for other people (NO in S202), the event extractor 220 extracts a scheduled future event by referring to the schedule information 300 of the user 99 (S206). For example, when the identification result of the user 99 indicates "A", the event extractor 220 obtains the schedule information 300 of the user A via the communicator 250. The event extractor 220 then extracts, from the obtained schedule information 300, an event for the user A to meet people, the event being scheduled at a date and time after the current date and time.

Next, details of the item determination processing in step S106 will be described with reference to FIG. 9. FIG. 9 is a flowchart illustrating details of the item determination processing in the first embodiment.

The item determiner 230 calculates a difference time between the current date and time and the start date and time of an event (S302). For example, when a plurality of events are extracted in step S104, the item determiner 230 calculates a difference time between the start date and time of the nearest future event and the current date and time. More specifically, when the current date and time is 6:00 on Jan. 25, 2015, and the plurality of events included in the schedule information 300 illustrated in FIG. 6 are extracted, the item determiner 230 calculates a difference time (5 hours) between the start date and time (11:00 on Jan. 25, 2015) of the event "date with X" and the current date and time (6:00 on Jan. 25, 2015).

The item determiner 230 selects one unselected item of the plurality of items (S304). For example, the item determiner 230 selects one of the plurality of items indicated by the item information 213 illustrated in FIG. 5.

The item determiner 230 obtains a pre-defined duration as a period of time for which the smell remains after eating the selected item (S306). For example, the item determiner 230 obtains 6 hours as the duration of selected kimchi.

The item determiner 230 determines whether or not the duration obtained in step S304 is larger than the difference time calculated in step S302 (S308). For example, when kimchi is selected, the item determiner 230 determines that the duration (6 hours) is larger than the difference time (5 hours). Also, for example, when kusaya is selected, the item determiner 230 determines that the duration (3 hours) is smaller than the difference time (5 hours).

In this case, if the duration is larger than the difference time (YES in S308), the item determiner 230 determines that the selected item is an item associated with the event (S310). On the other hand, if the duration is smaller than or equal to the difference time (NO in S308), the item determiner 230 determines that the selected item is not an item associated with the event.

The item determiner 230 determines that all of the items indicated by the item information 213 illustrated in FIG. 5 have been selected (S312). In this case, if all of the items have been selected (YES in S312), the item determination processing is finished, and any of the items is un-selected, the process returns to step S304 (NO in S312).

As described above, the item determiner 230 determines, as an item associated with the event, an item having a duration that is pre-defined as a period of time for which smell remains after eating and that is larger than the difference time. For example, when the difference time is 5 hours, only kimchi having a duration of 6 hours among kimchi, kusaya, and gyoza is determined as an item associated with the event.

Figure 10:
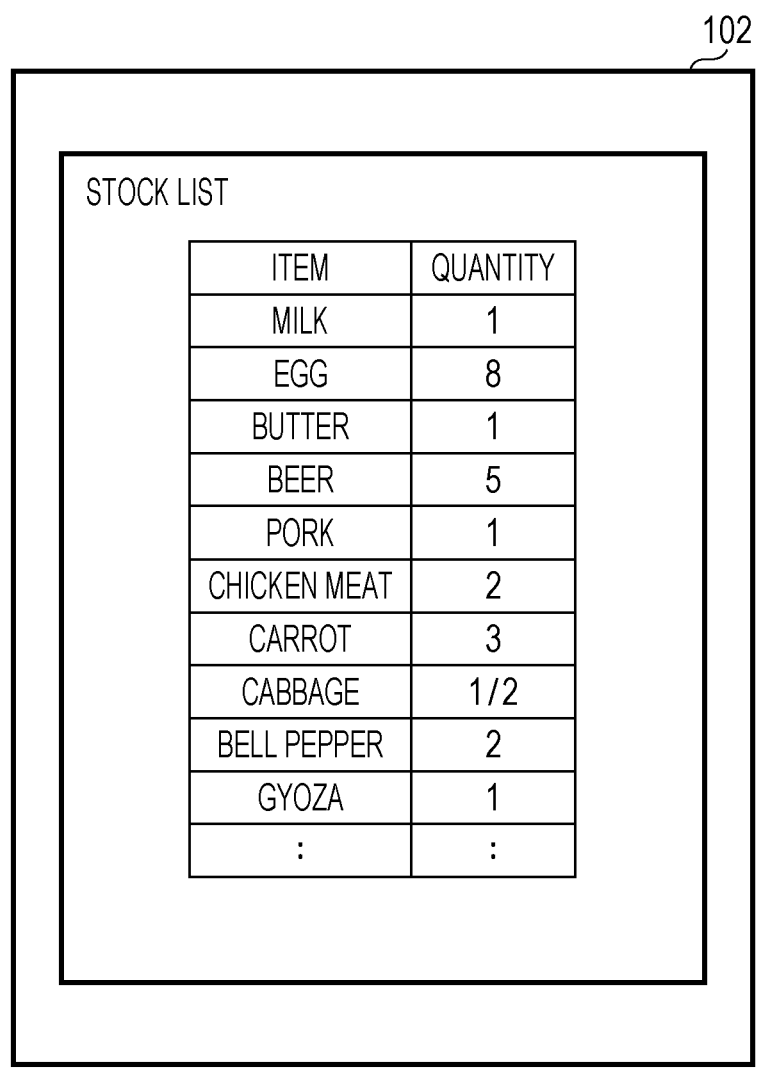
FIG. 10 is a view illustrating one example of information presented in the first embodiment.

FIG. 10 is a view illustrating one example of information presented in the first embodiment. In FIG. 10, a plurality of items stored in the refrigerator 100 and the amounts of stocks of the items are displayed on the display 102. In the above-described example, since it is determined that kimchi stored in the refrigerator 100 is an item associated with the event, kimchi is not displayed on the display 102. That is, information relating to the item(s) that is (are) included in the one or more items stored in the refrigerator 100 and that is (are) different from the determined item is presented to the user 99.

The information relating to the items stored in the refrigerator 100 is stored in the storage unit 210 as the stock information 211. Thus, by referring to the stock information 211, the information generator 240 can identify, in the information relating to the one or more items stored in the refrigerator 100, the item(s) different from the item determined by the item determiner 230.

In the example illustrated in FIG. 10, items that are included in the plurality of items stored in the refrigerator 100 and that are different from the item associated with the event and the amounts of stocks of the items are displayed on the display 102, but the present disclosure is not limited thereto.

For example, of one or more items stored in the refrigerator 100, the same item as an item associated with the event may be displayed on the display 102 as display information relating to an item.

In this case, the display information may include information (warning information) indicating that there is a possibility of affecting the event when the item associated with the event is ingested.

The information (warning information) indicating that there is a possibility of affecting the event when the item is ingested may be, for example, information that presents a message "it is better not to eat the item".

The information relating to a plurality of items stored in the refrigerator 100 is stored in the storage unit 210 as the stock information 211. Hence, by referring to the stock information 211, the information generator 240 can identify, in the information relating to one or more items stored in the refrigerator 100, the same item as the item determined by the item determiner 230.

In this example, for example, the information generator 240 in the server 200 may generate display information including, of the information relating to the plurality of items stored in the refrigerator 100, the information relating to the same item as the item determined by the item determiner 230.

Alternatively, for example, the information generator 240 in the server 200 may generate display information including information relating to an item that is included in the plurality of items stored in the refrigerator 100 and that is the same as the item determined by the item determiner 230 and the information (warning information) indicating that there is a possibility of affecting an event when the item is ingested.

Figure 11:
FIG. 11 is a view illustrating one example of warning information in the first embodiment.

FIG. 11 is a view illustrating one example of the information (warning information) indicating that there is a possibility of affecting an event when an item is ingested. It is desirable that this information include, for example, the time at which a scheduled event is started, the name of the event, and a message indicating how the event is affected. What is displayed in this case is warning information including a description showing "18:00" as the time at which a scheduled event is started, "the meeting" as the name of the event, and "the smell remains" as the message indicating how the event is affected.

In each embodiment described above, the identifying unit 110 detects a face area in an image of the user 99 photographed by the sensor 101 and extracts an amount of features from the detected face area. In addition, the above description has been given of a case in which the identifying unit 110 identifies the identifier of the user 99 by verifying the extracted amount of features against a plurality of amounts of features pre-held in association with the identifiers of a plurality of users.

However, the present disclosure is not limited to this case. For example, the identifying unit 110 may detect the area of a user's fingerprint or pupil included in an image of the user 99 photographed by the sensor 101 and extract an amount of features from the detected area.

The sensor 101 may also detect, for example, voice of the user 99. In this case, the sensor 101 has a microphone or the like. In this case, the sensor 101 detects voice of the user 99 which is included in voice information collected by the microphone. The identifying unit 110 extracts an amount of features from the voice information detected by the sensor 101.

In short, the identifying unit 110 may have any specific configuration that can identify the user 99 in front of the refrigerator 100.

[Advantages]

As described above, according to the information presenting system 10 in the present embodiment, it is possible to present a user with information relating to one or more items stored in a refrigerator, based on items associated with a scheduled future event extracted by referring to the schedule information corresponding to the user. Thus, it is possible to present the user with information relating to items suitable for the activity schedule of the user.

According to the information presenting system 10 in the present embodiment, it is possible to present the user with information relating to one or more items stored in a refrigerator, based on items that adversely affect a scheduled future event. Thus, it is possible to prevent or reduce the user taking out the items that adversely affect a scheduled future event from the refrigerator.

According to the information presenting system 10 in the present embodiment, when an event for the user to meet people is scheduled, it is possible to determine items whose smells remain after eating. Thus, information can be presented to the user, based on the items whose smells remain after eating. As a result, it is possible to prevent or reduce the user ingesting the items whose smells remain after eating, before an event for the user to meet people is started.

In addition, according to the information presenting system 10 in the present embodiment, it is possible to determine items associated with a scheduled future event, considering the durations for which the smells remain after eating and the difference time between the current date and time and the start date and time of the scheduled future event. Accordingly, it is possible to determine items whose smells remain until the start date and time of the scheduled future event as items associated with the scheduled future event, and it is also possible not to determine items whose smells disappear before the start date and time of the event as items associated with the scheduled future event. As a result, it is possible to appropriately determine items that adversely affect the scheduled future event.

In addition, according to the information presenting system 10 in the present embodiment, it is possible to present the user with information relating to items that are different from the items that adversely affect a scheduled future event. Thus, when the user takes out items from the refrigerator on the basis of the presented information, it is possible to prevent or reduce taking out items that adversely affect the scheduled future event.

In addition, according to the information presenting system 10 in the present embodiment, when the user is a person who prepares meals for other people, it is possible to extract a scheduled future event by referring to the schedule information of the other people in addition to the schedule information of the user. Accordingly, it is possible to prevent or reduce the user preparing meals including an item that adversely affects the event for the other people.

In addition, according to the information presenting system 10 in the present embodiment, it is possible to extract an event scheduled within a pre-defined period from the current date and time. Accordingly, it is possible to extract a scheduled future event on which intake of an item has a large influence, and it is possible to more appropriately present the user with information relating to items suitable for the activity schedule of the user.

Second Embodiment

Next, a second embodiment will be described in detail with reference to FIGS. 12A to 16. A description in the present embodiment will be given of a service presenting system that provides a service including presenting information relating to items in a refrigerator.

[Overview of Service to Be Provided]

FIG. 12A illustrates an overview of a service presenting system in the second embodiment.

A group 1000 is, for example, a company, an entity, or a family, and the scale thereof is not limited. The group 1000 has apparatuses A and B, included in a plurality of apparatuses 1010, and a home gateway 1020. For example, the apparatus A is a refrigerator in each embodiment described above. The plurality of apparatuses 1010 include apparatuses (e.g., smartphones, a personal computer (PC), and a TV) that can connect to the Internet and apparatuses (e.g., lights and a washing machine) that cannot connect to the Internet on their own. The plurality of apparatuses 1010 may include an apparatus that can connect to the Internet via the home gateway 1020 even if it is not capable of connecting to the Internet on its own. The group 1000 includes users 990A who use the plurality of apparatuses 1010.

A data-center operating company 1100 has a cloud server 1110. The cloud server 1110 is a virtualization server that cooperates with various apparatuses through the Internet. For example, the cloud server 1110 corresponds to the server in each embodiment described above. The cloud server 1110 mainly manages, for example, big data that is difficult to process with a typical database-management tool or the like. The data-center operating company 1100 performs data management, management of the cloud server 1110, operations of a data center that performs the management, and so on. Details of a service provided by the data-center operating company 1100 are described later. In this case, the data-center operating company 1100 is not limited to a company that performs only data management, operations of the cloud server 1110, or the like. For example, when an apparatus manufacturer that develops and manufactures one of the plurality of apparatuses 1010 also performs data management, management of the cloud server 1110, and so on, this apparatus manufacturer corresponds to a data-center operating company 1100 (FIG. 12B). The data-center operating company 1100 is not limited to a single company. For example, when the apparatus manufacturer and another management company perform data management and operation of the cloud server 1110 in cooperation with each other or in a shared manner, one of or both the apparatus manufacturer and the other management company is/are assumed to correspond to a data-center operating company 1100 (FIG. 12O).

A service provider 1200 has a server 1210. The size of the server 1210 as used herein is not limited, and examples of the server 1210 include a memory in a PC or the like. The service provider 1200 may or may not have the server 1210.

In the service described above, the home gateway 1020 is not essential. For example, when the cloud server 1110 performs all data management, the home gateway 1020 may be eliminated. There are also cases in which the plurality of apparatuses 1010 does not include any apparatus that is incapable of connecting to the Internet on their own, as in a case in which all apparatuses in a home are connected to the Internet.

Next, a description will be given of a flow of information in the above-described service.

First, the apparatus A or B in the group 1000 transmits log information to the cloud server 1110 in the data-center operating company 1100. The cloud server 1110 aggregates log information of the apparatus A or B ((a) in FIG. 12A). The "log information" as used herein refers to information indicating, for example, the operating statuses, the operation dates and times, the operation modes, and the positions of the plurality of apparatuses 1010. Examples of the log information include a viewing history of a television, video-recording-reservation information of a recorder, the operation date and time of a washing machine, the amount of laundry thereof, the date and time when the door of a refrigerator was opened/closed, and the number of times the door of the refrigerator was opened/closed. The log information may also be directly supplied from the plurality of apparatuses 1010 to the cloud server 1110 through the Internet. The log information from the plurality of apparatuses 1010 may also be temporarily aggregated in the home gateway 1020 and be supplied from the home gateway 1020 to the cloud server 1110.

Next, the cloud server 1110 in the data-center operating company 1100 supplies the aggregated log information to the service provider 1200 in a certain unit of information. The certain unit of information may be a unit with which the data-center operating company 1100 can organize the aggregated information and can supply it to the service provider 1200 or may be a unit requested by the service provider 1200. The log information may also be provided in a unit other than the certain unit of information, and there are also cases in which the amount of information provided changes depending on the situation. The log information is stored in the server 1210 of the service provider 1200, as appropriate ((b) in FIG. 12A). The service provider 1200 then organizes the log information into information that suits a service to be provided to users, and provides the service to users. The users to which the information is provided may be the users 990A of the plurality of apparatuses 1010 or may be outside users 990B. A method for providing the service to the users may be, for example, a method in which the service is directly supplied from the service provider to the users ((e) and (f) in FIG. 12A). For example, the method for supplying the service to the users may be, for example, a method in which the service is supplied to the users after going through the cloud server 1110 in the data-center operating company 1100 again ((c) and (d) FIG. 12A). The cloud server 1110 in the data-center operating company 1100 may also organize the log information into information that suits the service to be presented to the users, and may provide the service to the service provider 1200.

The users 990A and the users 990B may be the same or may be different from each other.

The technology described in the above aspects can be realized, for example, by the following types of cloud service. However, the types of service for which the technology described in the above-described aspects is realized are not limited to the types described below.

[Service Type 1: Inhouse Data Center Type]

FIG. 13 illustrates service type 1 (an inhouse data center type). This type is a type in which a service provider 1200 obtains information from a group 1000 and provides a user with a service. In this type, the service provider 1200 has functions of a data-center operating company. That is, the service provider 1200 has a cloud server 1110 that manages big data. Thus, no data-center operating company exists.

In this type, the service provider 1200 operates and manages a data center 903 (corresponding to the cloud server 1110). The service provider 1200 manages an operating system (OS) 902 and an application 901. The service provider 1200 uses the OS 902 and the application 901, managed by the service provider 1200, to provide a service 904.

[Service Type 2: IaaS Usage Type]

Figure 14:
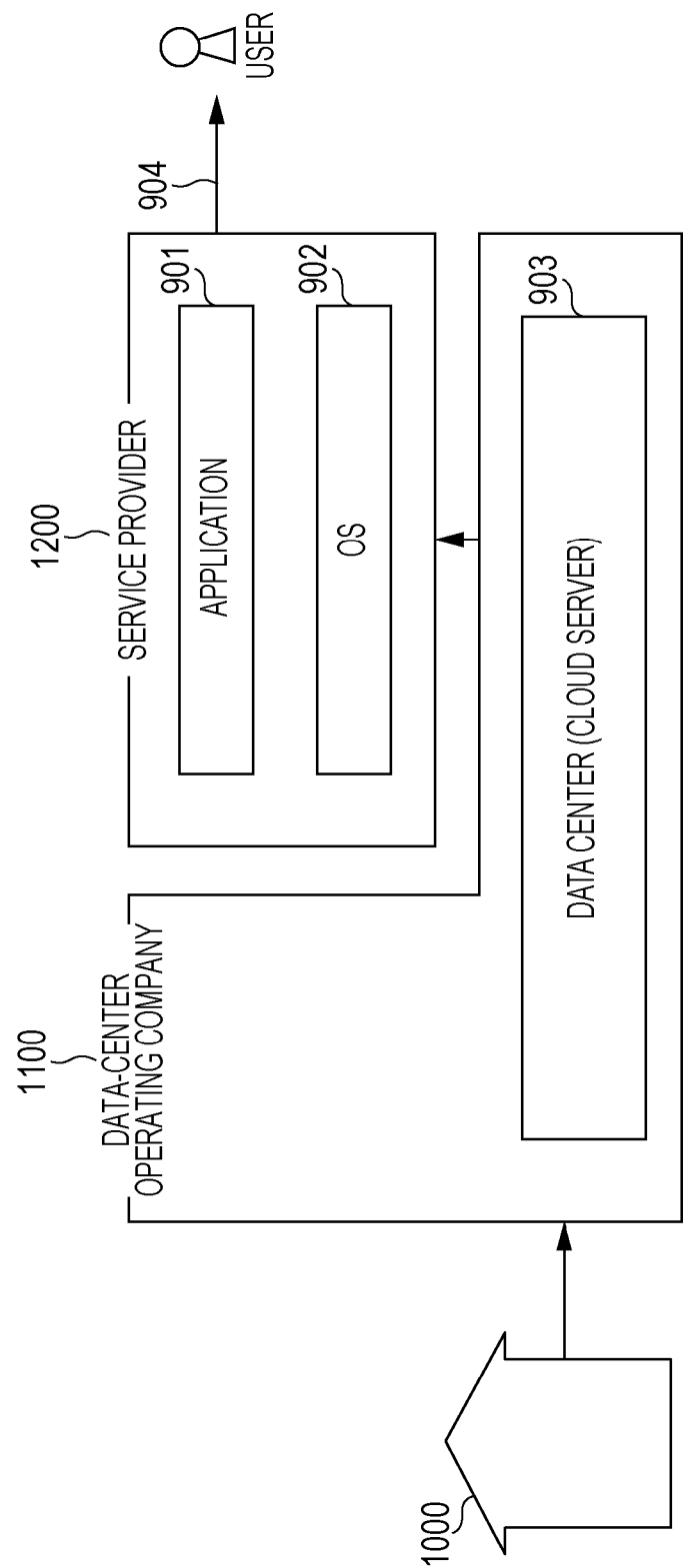
FIG. 14 is a diagram illustrating service type 2 (an IaaS usage type) in the second embodiment.

FIG. 14 illustrates service type 2 (an IaaS usage type). IaaS is an acronym of Infrastructure as a Service and is a cloud-service-providing model that provides, as a service over the Internet, infrastructure itself for constructing and operating a computer system.

In this type, a data-center operating company 1100 operates and manages a data center 903 (corresponding to the cloud server 1110). A service provider 1200 manages an OS 902 and an application 901. The service provider 1200 uses the OS 902 and the application 901, managed by the service provider 1200, to provide a service 904.

[Service Type 3: PaaS Usage Type]

Figure 15:
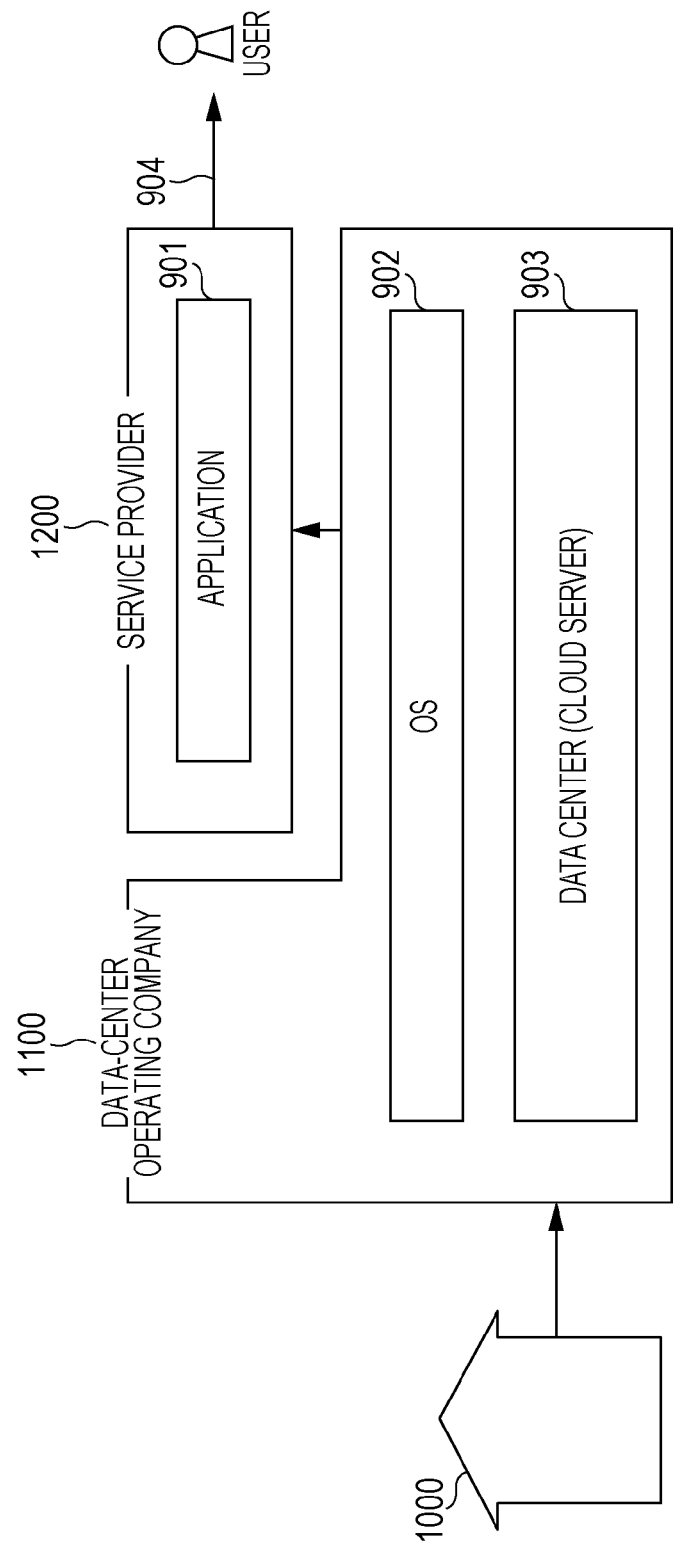
FIG. 15 is a diagram illustrating service type 3 (a PaaS usage type) in the second embodiment.

FIG. 15 illustrates service type 3 (a PaaS usage type). PaaS is an acronym of Platform as a Service and is a cloud-service-providing model that provides, as a service over the Internet, a platform that serves as a foundation for constructing and operating software.

In this type, a data-center operating company 1100 manages an OS 902 and operates and manages a data center 903 (corresponding to the cloud server 1110). A service provider 1200 manages an application 901. The service provider 1200 uses the OS 902, managed by the data-center operating company 1100, and the application 901, managed by the service provider 1200, to provide a service 904.

[Service Type 4: SaaS Usage Type]

FIG. 16 illustrates service type 4 (a SaaS usage type). SaaS is an acronym of Software as a Service. SasS is a cloud-service-providing model having, for example, a function that allows companies and individuals (users) that do not own a data center (a cloud server) to use, over a network such as the Internet, applications provided by a platform provider that owns a data center (a cloud server).

In this type, a data-center operating company 1100 manages an application 901 and an OS 902 and operates and manages a data center 903 (corresponding to the cloud server 1110). The service provider 1200 uses the OS 902 and the application 901, managed by the data-center operating company 1100, to provide a service 904.

It is assumed that, in any of the types described above, the service provider 1200 provides a service. Also, for example, the service provider or the data-center operating company may itself develop the OS, the application, a database for big data, or the like or may also outsource the development to a third party.

Other Embodiments

Although the information presenting system according to one or more aspects of the present disclosure has been described above in conjunction with the embodiments, the present disclosure is not limited to the embodiments. Modes obtained by applying various modifications conceived by those skilled in the art to the embodiments or modes constituted by combining constituent elements in different embodiments may also be encompassed by the scope of one or more aspects of the present disclosure, as long as such modes do not depart from the subject matter of the present disclosure.

Although an image is used to identify a user in each embodiment described above, the present disclosure is not limited thereto. For example, a thermal image may be used to identify a user, or face detection processing, face extraction processing, face identification processing, or the like may be performed on a thermal image to identify a user. Also, for example, a fingerprint or voice of the user, information input by the user, or information of an apparatus/device carried by the user may be used to identify the user. In this case, the sensor does not necessarily have to be limited to a camera and may be implemented by a fingerprint sensor, a microphone, an integrated-circuit (IC) tag reader, a wireless communication module, or an input device. In addition, for example, a user-specific button (such as an electronic button) may be provided on the refrigerator or the like so that the user can be identified in accordance with an input using the electronic button.

Although an example in which presenting the user with information relating to the determined item is prohibited has been mainly described in each embodiment described above, the information may be presented to the user in a form in which the user can recognize that the determined item is an item that adversely affects an event.

Although, in each embodiment described above, an item that adversely affects a scheduled future event has been determined as an item associated with a scheduled future event, an item that has a positive influence on an event may be determined as an item associated with a scheduled future event. In this case, information relating to the determined item may be presented to the user with high priority. For example, when an item that has a favorable influence on a scheduled future event is determined, information relating to the item may be presented to the user with high priority. Examples of the information presentation with high priority include presenting only the information and presenting the information after listing it higher than other information.

Although an example in which an item whose smell remains after eating is determined as an item associated with an event for meeting people has been described in each embodiment described above, a combination of an event and an item are not limited thereto.

For example, the event may be an event involving nervousness (e.g., an achievement test, an employment test, or a piano recital). In this case, an item (e.g., a food containing serotonin or tryptophan) having an effect of alleviating nervousness may be determined as an item associated with the event. As a result, in the information presenting system, information relating to items having an effect of alleviating nervousness can be presented to the user with high priority, and thus it can be expected that nervousness is alleviated in the event.

Also, for example, the event may be an event (e.g., having dinner at a restaurant or attending a wedding reception) where meals are served. In this case, a food that gives a long-lasting feeling of fullness may be determined as an item associated with the event. This makes it possible to prohibit presenting information relating to a food that gives a long-lasting feeling of fullness, thus making it possible to suppress feeling full prior to the event.

Also, for example, the event may be an event scheduled early next morning. In this case, foods corresponding to alcoholic beverages and snacks may be determined as items associated with the event. This can prevent presenting information relating to foods corresponding alcoholic beverages and snacks, thus making it possible to suppress oversleeping and being late for an event early in the morning.

The arrangement of the constituent elements in each embodiment described above is one example, and which apparatus includes which constituent element is not limited to the particular embodiment. For example, the refrigerator may include constituent elements of a server. That is, the refrigerator may have an event extractor, an item determiner, and an information generator. In this case, the information presenting system does not necessarily have to include the server. A display unit may be included in an apparatus (e.g., a smartphone or a tablet computer) different from the refrigerator. In this case, the refrigerator does not necessarily have to include the display unit and the display. The storage unit in the server may store schedule information. In this case, the server does not necessarily have to receive the schedule information via the communicator.

The stock information, the user information, the item information, and the schedule information illustrated in each embodiment described above are examples, and the present disclosure is not limited thereto. For example, the stock information may further include information indicating chambers (e.g., a refrigerating chamber, a freezing chamber, and a vegetable chamber) where items are stored.

Although, in each embodiment described above, a determination as to whether or not the user is a person who prepares meals for other people is made using the user information, the user information does not necessarily have to be used. For example, a determination as to whether or not the user is a person who prepares meals for other people may be made based on the frequency at which the user opens/closes the door of the refrigerator. In this case, the refrigerator or the server may hold each user's history of opening/closing the door of the refrigerator.

Although, in each embodiment described above, the display information is displayed to present the information to the user, the information presentation is not limited thereto. For example, the information may be presented to the user by way of sound. In this case, the information presenting system may have an audio output unit instead of the display unit. The audio output unit is, for example, a speaker.

For example, when the refrigerator 100 has the audio output unit (not illustrated), the information generator 240 in the server 200 may generate sound information relating to one or more items on the basis of the determined item.

For example, the communicator 250 in the server 200 transmits, to the refrigerator 100 through the network, signals for causing the audio output unit in the refrigerator 100 to output the sound information generated by the information generator 240 in the server 200. The signals for causing the audio output unit in the refrigerator 100 to output the generated sound information include, for example, the generated sound information and control information for causing the audio output unit to output the sound information.

The communicator 130 in the refrigerator 100 receives, from the server 200, the signals for causing the audio output unit to output the sound information.

The audio output unit in the refrigerator 100 outputs the sound information in accordance with the control information included in the signals received from the server 200. As a result of outputting of the information relating to one or more items stored in the refrigerator 100 from the audio output unit by way of sound, the information is presented to the user 99.

Also, for example, when an apparatus (not illustrated) used by the user connects to the server 200 through the network, the communicator 250 may transmit, to the apparatus used by the user, signals for causing the apparatus used by the user to output the display information or the sound information generated by the information generator 240 in the server 200.

The apparatus used by the user may be a mobile phone used by the user or a portable terminal (not illustrated), such as a watch worn by the user. Examples of the apparatus used by the user include the refrigerator 100.

For example, when the portable terminal has a display (not illustrated), the communicator 250 may transmit, to the portable terminal through the network, signals for causing the display of the portable terminal to display the display information generated by the information generator 240 in the server 200.

The signals for causing the display (not illustrated) of the portable terminal to output the generated display information include, for example, the generated display information and control information for causing the display to output the display information.

The communicator in the portable terminal receives, from the server 200, the signals for causing the display to display the display information.

The display of the portable terminal displays the display information in accordance with the control information included in the signals received by the server 200. As a result, the information relating to one or more items stored in the refrigerator 100 is displayed on the display of the portable terminal and is thus presented to the user 99.

Alternatively, for example, when the portable terminal has an audio output unit (not illustrated), signals for causing the audio output unit in the portable terminal to output the sound information generated by the information generator 240 in the server 200 may be transmitted to the portable terminal through the network.

The signals for causing the audio output unit in the portable terminal to output the generated sound information include, for example, the generated sound information and control information for causing the audio output unit to output the sound information.

The communicator in the portable terminal receives, from the server 200, the signals for causing the audio output unit to output the sound information.

The audio output unit in the portable terminal outputs the sound information in accordance with the control information included in the signals received from the server 200. As a result, the information relating to one or more items stored in the refrigerator 100 is output from the audio output unit in the portable terminal by way of sound and is thus presented to the user 99.

Although, in each embodiment described above, processing is ended upon presentation of the information relating to one or more items stored in the refrigerator, information that is useful for an extracted event may further be presented. For example, the information presenting system may present information for reducing smell, when a determined item whose smell remains after eating is taken out from the refrigerator.

Although, in each embodiment described above, what type of person the user is going to meet is not considered in the event extraction, the event may be extracted according to the person the user is going to meet. For example, only an event for meeting a person you need to pay attention to may be extracted, and an event for meeting a person you don't need to pay attention to does not necessarily have to be extracted. In this case, information for determining whether or not it is necessary to pay attention may be stored, for example, in the storage unit in the server. In this case, for example, when a person's name included in the schedule information of the user includes a person's name stored in a database (not illustrated), presentation of the information relating to items whose smells remain after eating may be prohibited. Also, presentation of the information relating to items whose smells remain after eating may be prohibited according to the honorific given to a person's name included in the schedule information of the user. Examples of the honorific include "sama", "san", "teacher", "professor", "doctor", "minister", "commissioner", "executive director", "director", and "president". With this approach, presentation of the information relating to items whose smells remain is prohibited for only an event for meeting a person who needs to be paid attention to, thus making it possible to more appropriately present the information.

Although, in each embodiment described above, what kind of place where the event is held is not considered in the extraction of the event, the event may be extracted according to the place. For example, only an event for meeting people in a small space (e.g., a meeting room) may be extracted as an event place, and an event for meeting people in a large space (e.g., a baseball park) does not need to be extracted. In this case, information indicating the size of the space (place) may be stored, for example, in the storage unit in the server. Presentation of the information relating to items whose smells remain after eating is prohibited only for an event for meeting people in a small space, thus making it possible to more appropriately present the information.

Although, in each embodiment described above, an event of the user is extracted with reference to the schedule information of the user, an event of the user may also be extracted with reference to the schedule information of the other person. For example, an event for another person to meet the user may also be extracted with reference to the schedule information of another person who shares the schedules of the user. With this approach, even when an event is mistakenly unregistered in the schedule information of the user, it is possible to appropriately extract an event to which the user is related.

Also, when an event name included in the schedule information of the user matches an event name stored in the database (not illustrated), presentation of information relating to items whose smells remain after eating may be prohibited. Examples of the event name stored in the database (not illustrated) include schedules for meeting an important person, such as a date, an interview, a briefing, a business meeting, a meeting, a party, and a ceremony; schedules in which the interpersonal distance is expected to be small, such as going to see a soccer or baseball game, social dancing, and singing in a chorus; and schedules involves speaking.

When a place name included in the schedule information of the user includes a place name stored in the database (not illustrated), presentation of information relating to items whose smells remain after eating may be prohibited. Such a place name may be pre-set by the user. Examples include the name of a place generally considered to be prestigious.

One aspect of the present disclosure may be directed to not only such an information presenting system but also an information presenting method including a step of a characteristic constituent element included in the information presenting system. One aspect of the present disclosure may be directed to a computer program for causing a computer to execute characteristic steps included in the information presenting method. In addition, one aspect of the present disclosure may be directed to a non-transitory computer-readable recording medium in/on which such a computer program is recorded.

In each embodiment described above, the individual constituent elements may be constituted by dedicated hardware or may be realized by executing a software program suitable for the constituent elements. A program executor, such as a central processing unit (CPU) or a processor, may read and execute a software program recorded in a recording medium, such as a hard disk or a semiconductor memory, to thereby realize the constituent elements. In this case, the software for realizing the information presenting system and so on in each embodiment described above is a program as follows.

This program causes a computer to execute an information presenting method for presenting a user with information relating to one or more items stored in a refrigerator. The method includes: identifying the user; extracting a scheduled future event by referring to schedule information corresponding to the user, based on an identification result of the user; determining an item associated with the extracted scheduled future event; generating information including information that is to be presented to the user, based on the determined item, the information that is to be presented to the user being included in stock information relating to one or more items stored in the refrigerator; and presenting the generated information to the user.

The information presenting method according to the present disclosure is useful for an inventory control system that presents a user with stock information of items stored in a refrigerator.

What is claimed is:

1. An information presenting method comprising:
receiving, from a refrigerator through a network, a signal including an identification result of a user identified by a sensor included in the refrigerator;
extracting a scheduled future event by referring to schedule information corresponding to the user, based on the identification result of the user, the schedule information being included in a plurality of pieces of schedule information of users stored in a memory, wherein the scheduled future event for the user is a personal meeting;
determining an item for which a smell remains after eating the item, the item being associated with the extracted scheduled future event;
generating information of at least one item that is to be presented to the user, based on the determined item, the information that is to be presented to the user being included in stock information that is stored in the memory and related to one or more items stored in the refrigerator; and
transmitting, to an apparatus used by the user through the network, a signal for causing the apparatus to output the generated information.

2. The information presenting method according to claim 1,
   wherein, the item for which a smell remains after eating the item is pre-defined as an item that adversely affects the scheduled future event.

3. The information presenting method according to claim 1, further comprising:
   calculating a time between a current date and time and a start date and time of the scheduled future event,
   wherein, in the determining of the item, an item having a duration that is pre-defined as a period of time for which a smell remains after eating the item and that is larger than the calculated time is determined as the item associated with the scheduled future event.

4. The information presenting method according to claim 2,
   wherein, in the generating of the information, of the stock information that is stored in the memory and that relates to the one or more items stored in the refrigerator, information relating to an item different from the determined item is generated as the information of the at least one item that is to be presented to the user.

5. The information presenting method according to claim 2,
   wherein, in the generating of the information, of the stock information that is stored in the memory and that relates to the one or more items stored in the refrigerator, information relating to an item that is the same as the determined item is generated as the information of the at least one item that is to be presented to the user.

6. The information presenting method according to claim 1, further comprising:
   determining whether or not the user is a person who prepares a meal for another person, based on the identification result of the user,
   wherein, in the extracting of the scheduled future event, when it is determined that the user is a person who prepares a meal for another person, the scheduled future event is extracted by referring to the schedule information corresponding to the user and schedule information corresponding to the other person.

7. The information presenting method according to claim 1,
   wherein, in the extracting of the scheduled future event, an event scheduled within a pre-defined period from a current date and time is extracted as the scheduled future event.

8. The information presenting method according to claim 1,
   wherein the apparatus used by the user is the refrigerator; and
   in the transmitting of the signal, a signal for causing a display included in the refrigerator to display the generated information is transmitted to the refrigerator through the network.

9. The information presenting method according to claim 1,
   wherein the apparatus used by the user is the refrigerator; and
   in the transmitting of the signal, a signal for causing the refrigerator to output sound corresponding to the generated information is transmitted to the refrigerator through the network.

10. The information presenting method according to claim 1,
    wherein the apparatus used by the user is a portable terminal; and
    in the transmitting of the signal, a signal for causing a display included in the portable terminal to display the generated information is transmitted to the portable terminal through the network.

11. The information presenting method according to claim 1,
    wherein the apparatus used by the user is a portable terminal; and
    in the transmitting of the signal, a signal for causing the portable terminal to output sound corresponding to the generated information is transmitted to the portable terminal through the network.

12. The information presenting method according to claim 1,
    wherein a processor performs at least one of the receiving of the signal including the identification result of the user, the extracting of the future event, the determining of the item, the generating of the information of the at least one item, and the transmitting of the signal for causing the apparatus used by the user to output the generated information.

13. A non-transitory computer-readable recording medium recording a program, the program causing a computer to execute:
    receiving, from a refrigerator through a network, a signal including an identification result of a user identified by a sensor included in the refrigerator;
    extracting a scheduled future event by referring to schedule information corresponding to the user, based on the identification result of the user, the schedule information being included in a plurality of pieces of schedule information of users stored in a memory, wherein the scheduled future event for the user is a personal meeting;
    determining an item for which a smell remains after eating the item, the item being associated with the extracted scheduled future event;
    generating information of at least one item that is to be presented to the user, based on the determined item, the information that is to be presented to the user being included in stock information that is stored in the memory and that relates to one or more items stored in the refrigerator; and
    transmitting, to an apparatus used by the user through the network, a signal for causing the apparatus to output the generated information.

14. A server comprising:
    a memory that stores a plurality of pieces of schedule information of users and the information relating to the one or more items stored in a refrigerator;
    a processor that executes instructions to perform operations comprising:
    receiving, from the refrigerator through a network, a signal including an identification result of a user identified by a sensor included in the refrigerator;
    extracting a scheduled future event by referring to the schedule information corresponding to the user, based on the identification result of the user, the schedule information being included in the plurality of pieces of schedule information of the users stored in the memory, wherein the scheduled future event for the user is a personal meeting;
    determining an item for which a smell remains after eating the item, the item being associated with the scheduled future event;

generating information of at least one item that is to be presented to the user, based on the determined item, the information that is to be presented to the user being included in stock information that is stored in the memory and that relates to one or more items stored in the refrigerator; and transmitting, to an apparatus used by the user through the network, a signal for causing the apparatus to output the generated information.

15. An information presenting system comprising:

a refrigerator; and a server that is connected to the refrigerator through a network, wherein the refrigerator includes:
 a sensor that identifies a user, and
 a transmitter that transmits, to the server through the network, a signal including an identification result of the user identified by the sensor, and wherein the server includes:
 a memory that stores a plurality of pieces of schedule information of users and stock information relating to one or more items stored in the refrigerator,
 a processor that performs operations including:
  receiving, from the refrigerator through the network, a signal including the identification result of the user identified by the sensor,
  extracting a scheduled future event by referring to the schedule information corresponding to the user, based on the identification result of the user, the schedule information being included in the plurality of pieces of schedule information of the users stored in the memory, wherein the scheduled future event for the user is a personal meeting,
  determining an item for which a smell remains after eating the item, the item being associated with the extracted scheduled future event,
  generating information of at least one item that is to be presented to the user, based on the determined item, the information that is to be presented to the user being included in stock information that is stored in the memory and that relates to the one or more items stored in the refrigerator, and
  transmitting, to an apparatus used by the user through the network, a signal for causing the apparatus to output the generated information.

\* \* \* \* \*